March 17, 1964  E. P. JASPER  3,125,081
COOLING SYSTEMS FOR MARINE ENGINES
Filed Jan. 30, 1963
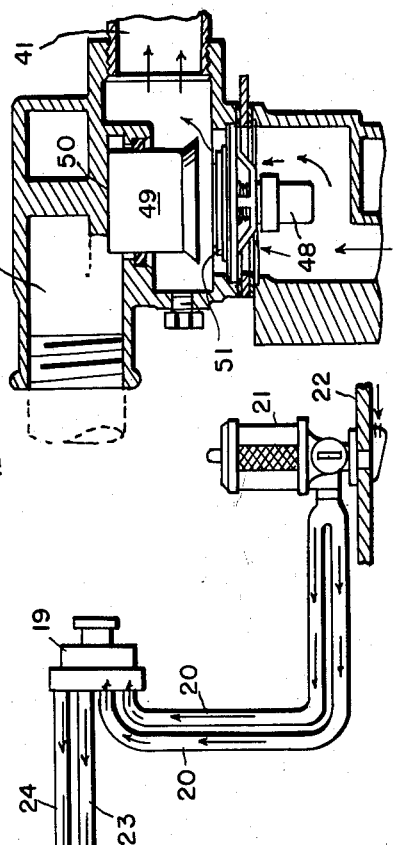
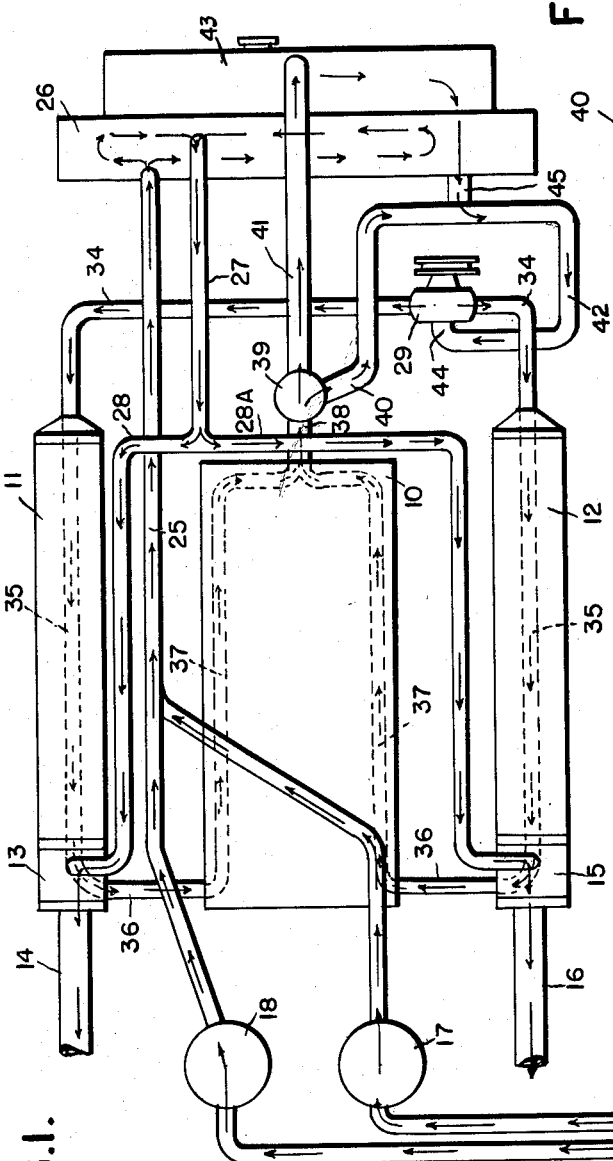
INVENTOR.
ELMER P. JASPER
BY Whittemore, Hulbert & Belknap
ATTORNEYS United States Patent Office 3,125,081
Patented Mar. 17, 1964

3,125,081
COOLING SYSTEMS FOR MARINE ENGINES
Elmer P. Jasper, Algonac, Mich., assignor to Chris-Craft Corporation, Pompano Beach, Fla., a corporation of Michigan
Filed Jan. 30, 1963, Ser. No. 255,058
6 Claims. (Cl. 123—41.09)

The invention relates to cooling systems for marine engines.

Marine engines normally use sea water as the primary coolant. Since boats with marine engines often navigate in both salt water and fresh water, an engine cooling system for marine engines must be adaptable for use with either salt water or fresh water as the primary coolant. When using salt water, it is important to avoid conditions which will cause the salt to drop out with its attendant disadvantages. Therefore marine cooling systems are necessarily quite different than the cooling systems which are used in connection with modern, highly efficient engines developed for land or air vehicles.

The present invention provides an improved cooling system for modern marine internal combustion engines.

One of the objects of the invention is to provide a closed cooling system which can readily and economically be obtained by a simple conversion of the standard engine cooling system disclosed in my copending application Serial No. 198,176, filed May 28, 1962.

Another object of the invention is to provide for the circulation of the sea water through oil coolers and to provide for circulation of the closed system coolant at high temperatures in the cylinder block.

These and other objects are obtained by a cooled system as hereinafter more fully described and illustrated in the accompanying drawings wherein:

FIGURE 1 is a diagrammatic view of the cooling system.

FIGURE 2 shows a thermostatic bypass valve.

In FIGURE 1, the cooling system is shown diagrammatically. 10 represents the cylinder block, cylinder head and intake manifold of the engine. No attempt has been made to illustrate the actual construction of these parts or the cooling passageways therethrough. 11 is an exhaust manifold arranged on the port side of the boat and 12 is a corresponding exhaust manifold on the starboard side. The port manifold leads through an adapter 13 to the overboard exhaust pipe 14. Similarly the starboard exhaust manifold 12 leads through an adapter 15 to the overboard exhaust pipe 16. 17 diagrammatically represents a cooler for the engine oil and 18 represents a cooler for the oil used in the hydraulic reverse gear.

In the cooling system of the present invention, sea water is supplied by means of a sea water pump 19, having two conduits 20 leading from a sea cock and strainer device 21 mounted on the hull 22 of the boat. From the sea water pump a supply conduit 23 leads to the reverse gear oil cooler 18 and a similar supply conduit 24 leads to the engine oil cooler 17. From each of the coolers above mentioned, the sea water is combined into a common line 25 which communicates with a heat exchanger 26. From this heat exchanger the sea water is expelled through conduit 27 and the branch conduits 28 and 28A leading to the adaptors 13 and 15 respectively. From said adaptors the sea water passes through the exhaust pipes 14 and 16 and overboard.

The recirculating water pump 29 has two outlets leading to the opposite sides of the engine. Each outlet is connected by a conduit 34 to the interior cooling passage 35 of one of the two exhaust manifolds. The cooling passage leads to the adjacent adaptor from which the coolant flows through conduit 36 into the cooling passage 37 in the cylinder block 10 of the engine. The cooling passages 35 and 37 are not illustrated in detail. However, it should be understood that passages 37 extend through the cylinder block, cylinder head and intake manifold in accordance with standard practice. The cooling passages 37 serve to maintain the working parts of the engine at the desired temperature for efficient operation of the engine. The two passages 37 are connected by a conduit 38 to the casing of a thermostatically controlled by-pass valve 39. The casing has one outlet 40 leading to the recirculating pump 29 and another outlet 41 leading to the surge tank 43. The outlet 40 is connected by conduit 42 leading to the inlet 44 of the pump.

The by-pass valve shown in more detail in FIGURE 2 is controlled by a thermostat 48. The valve 49 is adapted to move between the two seats 50 and 51. When the valve closes on seat 50, the passage to the pump is shut off. When the valve closes on seat 51, the passage to the outlet 41 and surge tank 43 is shut off. The valve may take intermediate positions depending upon the response of the thermostat to the water temperature from the engine.

With the construction as described, sea water is brought into the boat by means of the sea water pump 19 and is conducted by the conduits 23 and 24 through the oil coolers 17 and 18 respectively. From each cooler, sea water is combined into the common line 25, passed through the heat exchanger 26 and expelled through conduit 27 to the adapters 13 and 15 and overboard through the exhaust pipes. To assure an equal flow of water to each exhaust pipe at low speed as well as high speed, pressure relief valves can be used if so desired. When the pressure is below the setting of the relief valves, for example, two pounds, the sea water passes into the bottom of the exhaust manifold adaptor. However, when the engine speed is increased so that sea water pressures go beyond the setting of two pounds, then the sea water may be by-passed through the top of the exhaust manifold adapters. The function of the sea water pump in this closed system is to cool the engine oil and the reverse gear oil to a satisfactory operating temperature, to cool the water in the surge tank 43 coming from the closed portion of the system and to assist in cooling and manifolding the exhaust pipe.

The recirculating pump has a capacity to circulate water through the engine at high pressure and high rate. For example, a pump may be utilized which circulates seventy (70) gallons per minute through the engine at sixteen (16) pounds' pressure. From the recirculating pump, the water from the closed system is forced through the exhaust manifold headers, the exhaust manifold cooling passage 35, adapters 13 and 15 and into the cylinder block. The water continues on through the passages 37 in the cylinder block and cylinder head and out through the intake manifold. This part of the circulating system is the same as the standard cooling system for a marine engine.

The function of the thermostat 48 is to maintain a constant water temperature from the intake manifold water outlet. If the water in passing through the engine has not reached a high enough temperature, the thermostat allows the water to pass through into the circulating pump inlet 44. If, however, the water temperature has reached a maximum high according to the setting of the thermostat, the thermostatic valve closes off a portion of the water to the circulating pump and at the same time allows water to pass into the surge tank 43.

In the thermostat housing, if the water has not reached a certain temperature within the range of the thermostat, the thermostat will stay closed forcing all the water directly back into the circulating pump inlet. As the water recirculates through the engine the water temperature increases until the thermostat opens thus allowing a portion of the water to pass through the surge tank where it is cooled by the sea water passing through the heat exchanger 26. From the surge tank 43, the cooled water emerges through the pipe 45 and joins the conduit 42 for introduction into the inlet 44 of the pump.

The surge tank is located above the highest point of the engine. The tank is an integral part of the heat exchanger 26 and all the circulating water that goes into the heat exchanger must first pass through the surge tank. The function of the surge tank is to facilitate the filling of the closed portion of the cooling system and to maintain a head of water on the cooling system, thus assuring that the system is always full of water once it is properly filled. The surge tank also allows for expansion of the heated system.

The cooling system as above described is adaptable to V–8 engines, in line engines and/or engines with multiple cylinder banks of either gasoline or diesel type.

What I claim as my invention is:

1. A marine engine cooling system comprising separate seat water circuit and fresh water circuit, a heat exchanger connected into both of said circuits, a sea water pump, a supply line from the sea water pump to said heat exchanger, a return sea water line from said heat exchanger to an exhaust pipe and overboard, a fresh water pump, a supply line from said fresh water pump to an exhaust manifold, a fresh water connection from said manifold through the engine cylinder block, a thermostatic valve at the outlet of said engine cylinder block, a return conduit from said thermostatic valve to the inlet of said fresh water pump, a second conduit from said thermostatic valve to said heat exchanger and a return fresh water conduit from said heat exchanger to the inlet of said fresh water pump.

2. A marine engine cooling system comprising separate sea water circuit and fresh water circuit, a heat exchanger connected into both of said circuits, a sea water pump, an oil cooler connected thereto, a sea water connection between said oil cooler and said heat exchanger, a return sea water line from said heat exchanger to an exhaust pipe and overboard, a fresh water pump, a supply line from said fresh water pump to an exhaust manifold, a fresh water connection from said manifold through the engine cylinder block, a thermostatic valve at the outlet of said engine cylinder block, a return conduit from said thermostatic valve to the inlet of said fresh water pump, a second conduit from said thermostatic valve to said heat exchanger and a return fresh water conduit from said heat exchanger to the inlet of said water pump.

3. In a marine engine having cooling passages surrounding the high seated portions, a sea water supply pump, a supply line from said sea water pump, a heat exchanger connected to said supply line, a return sea water line from said heat exchanger to an exhaust pipe and overboard, a fresh water recirculating pump, a supply line from said recirculating pump to the exhaust manifold of said engine, a conduit between said exhaust manifold and the cylinder block of said engine, an outlet conduit from said engine, a thermostatic valve connected to said outlet compelling the recirculation of the water from said engine when at a temperature below a predetermined setting and also permitting discharge into said heat exchanger when above said temperature setting, and a fresh water return line from said heat exchanger to the inlet of said recirculating pump.

4. In a marine engine having cooling passages surrounding the high heated portions and having an oil cooler, a sea water supply pump, a supply line from said pump to said oil cooler, a heat exchanger connected to said oil cooler, a return sea water line from said heat exchanger to an exhaust pipe and overboard, a fresh water recirculating pump, a supply line from said recirculating pump to the exhaust manifold of said engine, a conduit between said exhaust manifold and the cylinder block of said engine, an outlet conduit from said engine, a thermostatic valve connected to said outlet compelling the recirculation of the water from said engine when at a temperature below a predetermined setting and also permitting discharge into said heat exchanger when above said temperature setting, and a fresh water return line from said heat exchanger to the inlet of said recirculating pump.

5. The combination as in claim 4 wherein there are two oil coolers, one for the engine oil and another for the reverse gear oil and there are two adapters and relief valves, one for each of said coolers, and the inlet of said recirculating pump is connected to both of said adapters.

6. A combination as in claim 4 in which the fresh water from said recirculating pump is divided and separately circulated through different portions of the engine and then recombined into said thermostatic valve.

References Cited in the file of this patent

UNITED STATES PATENTS

| | | |
|---|---|---|
| 1,361,033 | Ericson | Dec. 7, 1920 |
| 2,377,028 | Nicholas | May 29, 1945 |
| 2,392,723 | Chandler | Jan. 8, 1946 |
| 2,428,373 | Lloyd | Oct. 7, 1947 |
| 2,446,995 | Bay | Aug. 17, 1948 |